United States Patent [19]

Creasy

[11] Patent Number: 4,467,073

[45] Date of Patent: Aug. 21, 1984

[54] TRANSPARENT ANTI-FOG COATING COMPOSITIONS

[75] Inventor: Walter S. Creasy, Bridgewater, N.J.

[73] Assignee: Hydromer, Inc., Whitehouse, N.J.

[21] Appl. No.: 435,461

[22] Filed: Oct. 20, 1982

[51] Int. Cl.$^3$ .................................................. C08F 8/30
[52] U.S. Cl. ........................................ 525/127; 525/123
[58] Field of Search ............................. 525/127, 123

[56] References Cited

U.S. PATENT DOCUMENTS 4,100,309  7/1978  Micklus et al. .................... 525/127
4,254,239  3/1981  Straub et al. ....................... 525/123

FOREIGN PATENT DOCUMENTS 48-15477  5/1973  Japan ................................. 525/123

*Primary Examiner*—Theodore Morris
*Assistant Examiner*—Robert Sellers
*Attorney, Agent, or Firm*—John F. A. Earley

[57] ABSTRACT

An anti-fog liquid coating composition comprises: a polymer which is polyvinylpyrrolidone, polydimethylacrylamide or a polyvinylpyrrolidone copolymer with a polymerizable alpha olefin free of functional groups reactive with isocyanates; a polyisocyanate prepolymer; a surfactant which will chemically bond to a reaction product of the polymer and prepolymer, and an organic solvent to form a solution of the foregoing ingredients.

The invention includes a substrate having an anti-fog transparent coating comprising the reaction product of polyvinylpyrrolidone, a polyvinylpyrrolidone copolymer with a polymerizable alpha olefin free of functional groups reactive with isocyanates or polydimethylacrylamide with a polyisocyanate prepolymer, said reaction product being chemically bound to a surfactant.

On curing, the surfactant is chemically combined with the hydrophilic polymer/isocyanate prepolymer composition and is not subject to extraction in any significant amount while still conferring improved fog resistance to the coated substrate.

14 Claims, No Drawings

TRANSPARENT ANTI-FOG COATING COMPOSITIONS

TECHNICAL FIELD

This invention is in the field of coating compositions.

BACKGROUND OF THE PRIOR ART

It is known to use hydrophilic polymer coatings to reduce moisture fogging. The most effective of these coatings use soluble polymers which have a short life since they wash off. Polymers which are less hydrophilic, though more permanent, have more limited anti-fogging properties. It is also known to use pure surfactant solutions which function by depositing a soap film causing water droplets to spread. Such films also have a short life since they wash off. The same is true of hydrophilic polymer anti-fog coatings to which silicone based surfactants have been added since the surfactant still exists in a soluble form (see Canadian Pat. No. 1,012,283). U.S. Pat. No. 4,119,094, incorporated herein by reference, discloses slippery coatings of polyvinylpyrrolidone-polyurethane interpolymers which do not have good anti-fog properties.

The problems of the prior art have been solved by complexing or reacting surfactants with hydrophilic polymers that have been crosslinked with isocyanate prepolymers to provide hard, insoluble coatings with improved fog resistance, adhesion, scratch resistance and life. As used herein and in the claims, the term polymer is intended to include copolymers.

BRIEF SUMMARY OF THE INVENTION

An anti-fog liquid coating composition comprises: a polymer which is polyvinylpyrrolidone, polydimethylacrylamide or a polyvinylprrolidone copolymer with a polymerizable alpha olefin free of functional groups reactive with isocyanates; a polyisocyanate prepolymer; a surfactant which will chemically bond to a reaction product of the polymer and prepolymer, and an organic solvent to form a solution of the foregoing ingredients.

The invention includes a substrate having an anti-fog transparent coating comprising the reaction product of polyvinylpyrrolidone, a polyvinylpyrrolidone copolymer with a polymerizable alpha olefin free of functional groups reactive with isocyanates or polydimethylacrylamide with a polyisocyanate prepolymer, said reaction product being chemically bound to a surfactant.

On curing, the surfactant is chemically combined with the hydrophilic polymer/isocyanate prepolymer composition and is not subject to extraction in any significant amount while still confering improved fog resistance to the coated substrate.

DETAILED DESCRIPTION

The anti-fog liquid coating composition of the invention comprises a polymer which is polyvinylpyrrolidone, a hydrophilic polyvinylpyrrolidone copolymer with a polymerizable alpha olefin free of functional groups reactive with isocyanates or polydimethylamide, a polyisocyanate prepolymer, a surfactant which chemically bonds to a reaction product of the polymer and prepolymer by complexing or reacting therewith, and an organic solvent to form a solution of the foregoing ingredients.

Exemplary of the polyvinylpyrrolidone copolymers are poly (vinylpyrrolidone-co-vinyl acetate), poly (vinylpyrrolidone-co-ethylacrylate) and poly (vinylpyrrolidone-co-vinyl chloride).

The isocyanate prepolymer will be an isocyanate partially reacted with a polyol. It is preferred to use a prepolymer derived from an aliphatic isocyanate such as isophorone diisocyanate, 2,2,5 trimethylhexamethylene diisocyanate and alkyl substituted derivatives thereof, or 4,4' methylene, bis-(cyclohexyl diisocyanate). Other prepolymers of isocyanates and polyols are satisfactory such as the adduct of trimethylolpropane and diphenylmethane diisocyanate or tolylene diisocyanate. For further examples of isocyanate prepolymers reference may be had to "Encyclopedia of Polymer Science and Technology", H. F. Mark, N. C. Gaylord and N. M. Bikales (Eds.) (1969).

The ratio of weight of the polymer to the weight of isocyanate prepolymer preferably will be in the range from about 10 to 1 to about 3 to 1 based on the concentration of reactive isocyanate groups alone, i.e., the ratio of parts by weight of polymer to parts by weight of isocyante in the prepolymer irrespective of the other components of the isocyanate prepolymer. Typically, isocyanate prepolymers useful in the coatings art contain from 2 to about 30 percent isocyanate reactivity.

The surfactant will be present in an amount by weight of from about 0.1% to about 40%, preferable from about 5% to about 25%, of the combined weights of the polymer and isocyanate prepolymer. It is preferred to have a anionic surfactant such as a sulfonate, sulfate, phosphate or carboxlyate. Exemplary are dioctylsodiumsulfosuccinate, sodium lauryl sulfate, alkylphenoxypoly (ethylenoxy) ethyl sulfate, sodium naphthalene sulfonate and potassium perfluoroalkyl sulfonates.

Alternatively, where it is desired to have a surfactant which reacts with the isocyanate moeities of the isocyanate prepolymer, the surfactant may be a nonionic surfactant having isocyanate-reactive groups such as polyethoxylated nonylphenols, perfluoro (polyethyleneoxy) ethanol, ethylene oxide/propylene oxide block copolymers and poly propoxylated/ethoxylated ethylenediamine surfactants, plus the partially sulfated, phosphated or carboxylated derivatives of those nonionic surfactants with functionality $>1$.

Both nonionic and anionic surfactants may be used in the same coating composition to good effect.

As used in the context of this discussion, complex formation refers to the reversible or irreversible association of two substances usually altering the physical properties of both but without affecting their chemical makeup, whereas a chemical reaction involves a bond formation with concurrent changes in structure and/or composition. The term "chemically bonding" as used herein includes both reacting and complexing.

The above mentioned solid ingredients will be dissolved in an organic solvent which is substantially non-reactive with the said solid ingredients, the amount of which may vary within wide limits but preferably will be in an amount of from about 99% to about 80% of the weight of the above mentioned ingredients in the composition.

Exemplary of suitable solvents are ethyl lactate, diacetone alcohol, tertiary butyl alcohol, methylene chloride, trichloroethane and N-methylpyrrolidone. So long as miscible solvents are used, more than one solvent may be employed. Thus, for example, one solvent may be employed for a polymer and a different solvent for the isocyanate prepolymer so long as the solvents are miscible. Where the term solvent is used generally here and in the claims it is intended to include one or more solvents.

The polymer and the isocyanate prepolymer will react to form a reaction product. THe surfactant will form a complex in the case of an anionic surfactant by becoming bound to the polyvinylpyrrolidone, polyvinylpyrrolidone copolymer or polydimethylacrylamide portion of the reaction product. This complex forming behavior was studied and reported by S. Saito, Kolloid Zeitschrift, 154, 19, (1957). In the case of a nonionic surfactant, the surfactant reacts with the isocyanate moieties of the isocyanate prepolymer.

Other additives may be included such as leveling aids, viscosity modifiers, catalyts, ultraviolet stabilizers and biocides as is known and practiced in the coatings art.

The composition is readily prepared by mixing the solid ingredients in any order in the solvent at room temperature.

The thus prepared composition can readily be applied to a substrate by dipping, painting, spraying or the like. After the composition has been applied to the substrate, the solvent is evaporated at room temperature by air drying. More rapid evaporation can be achieved, if desired, by placing the coated substrate in an oven at a temperature of from about 50° to about 100° C. By the time the solvent is evaporated the reaction product and complex will be formed in the resultant coating composition.

Any substrate on which the prior art has used antifog coating composition may be employed with this invention. Typical are rubber, glass and plastics such as polyvinylchloride, polyurethanes, polyesters, polycarbonates, acrylic resins and polystyrenes. Typical uses are on eyeglasses and in solar hot water units.

EXAMPLES

Example I

Polyvinylpyrrolidone, PVP-K90, 2.5 g, was dissolved in 100 ml of a mixture of 75% diacetone alcohol and 25% cyclohexane, followed by 1.0 g dioctyl sodium sulfosuccinate surfactant and 5.0 g Tycel 7351 isocyanate prepolymer (Hughson Chemicals, Lord Corporation). Coatings applied with this composition and cured 24 hours at 72° F. were transparent, colorless, hard and scratch resistant and did not fog when cooled to 32° F. and then held over a beaker of boiling water. Fog resistance is not diminished after 20 cycles of cooling, exposing to steam and drying. The fog resistance is essentially intact after 3 days soaking in water. The coating exhibits excellent adhesion to polycarbonate, polyester, polymethylmethacrylate and cellulose acetate plastics.

Example II

PVP-K90, 2.5 g was dissolved in 100 ml of a mixture of 50% ethyl lactate and 50% methyl ethyl Ketone, followed by 1.5 g alkylphenoxypolyethyleneoxy sodium sulfate surfactant and 2.5 g Spenlite P25–60cx isocyanate prepolymer (Spencer-Kellogg Corp.). Coatings applied from this compositon and cured 72 hours at 72° F. are greatly superior in fog resistance to uncoated glass or plastics. Coatings are colorless, transparent and essentially equivalent with respect to the other properties described in Example I.

Example III

Tycel 7351 isocyanate prepolymer (Hughson Chemicals), 7.5 g, was dissolved in 100 ml of a mixture of 75% diacetone alcohol and 25% cyclohexane, followed by 1.5 g sodium dioctyl sulfosuccinate. Fully cured coatings from this composition functioned well as anti-fog coatings—but effectiveness was greatly reduced or lost after soaking in water. The utility of such coatings is therefore limited in the absence of a complex forming hydrophilic polymer.

Example IV

Polyvinylpyrrolidone, 2.5 g, was dissolved in 100 ml of a mixture of 75% tertbutyl alcohol and 25% xylene, followed by 5.0 g of Tycel 7351 isocyanate prepolymer (Hughson Chemicals) and 1.0 g dioctyl sodium sulfosuccinate. The properties of the fully dried and cured coating are equivalent to those described in Example I.

Example V

A vinyl pyrrolidone/vinyl acetate 70/30 copolymer is substituted for the polyvinylpyrrolidone in Example I. The coating preparation and properties are essentially equivalent to those described in Example I.

Example VI

Polydimethylacrylamide was substituted for the polyvinylpyrrolidone in Example I. The coating preparation and properties are essentially equivalent to those described in Example I.

Example VII

To the solution in Example I was added 0.05 g (1% based on isocyanate prepolymer) dibutyltin dilaurate catalyst. Cure is complete after 10 mins. at 60° C. with this additive. Other coating properties are identical to those described in Example I.

Example VIII

Polyvinylpyrrolidone (K90), 2.5 g, was dissolved in 100 ml of a mixture of 75% diacetone alcohol and 25% mineral spirits, followed by 5.0 g of Tycel 7351 isocyanate prepolymer, 3.0 g of polyethoxylated nonyl phenol surfactant (Triton X-100 of Rohm and Haas) and 0.05 g dibutyltin dilaurate catalyst. Coatings applied with this composition and cured 30 mins. at 60° C. are hard, colorless and transparent and retain their anti-fog properties particularly well after extended soaking in water as would be experienced for example in diving masks, etc. The surfactant is chemically bound in this case to the PVP-isocyanate coating matrix.

Example IX

The polyvinylpyrrolidone is omitted from the composition in Example VIII. The resultant coating functions poorly as an anti-fog coating and even much higher Triton X-100 concentrations fail to impart satisfactory fog-resisting qualities.

Example X

Polyvinylpyrrolidone (K90), 1.0 g was dissolved in a mixture of 85 g diacetone alcohol, 40 g cyclohexane and 10 g n-butyl acetate, followed by 2.0 g hexamethylene diisocyanate biuret (Desmodur N-100 made by Mobay Corp.). 2.5 g Acryloid AU608 polyol (Made by Rohm and Haas) and 0.7 g dioctyl sodium sulfosuccinate. This describes the in situ preparation of an isocyanate-terminated prepolymer. The coatings resulting from this solution, after curing 72 hours at R.T., are essentially identical in properties to those described in Example I.

Example XI

A dibutyltin dilaurate catalyst is added to the composition in Example X. The resulting coatings cure (0.5% on polymer solids) within 20 mins. at 60° C.

Example XII

The composition of Example X was prepared without the polyvinylpyrrolidone. The resultant coatings are essentially equivalent in physical properties and function well as anti-fogs. However, utility is limited as much of the anti-fog property is lost after soaking in water.

Example XIII

Polyvinylpyrrolidone (K90), 1.0 g is dissolved in a mixture of 85 g diacetone alcohol, 40 g cyclohexane and 10 g n-butyl acetate, followed by 4.0 g hexamethylene diisocyanate biuret (Desmodur N-100 made by Mobay Corp.), 4.0 g Acryloid polyol (Made by Rohm and Haas) AU608 and 3.0 g perfluorinated (polyethyleneoxy) ethanol (Fluorad FC170C made by 3M). The wetting agent is bound in this coating through reaction between the surfactant and groups (—OH) and isocyanates. The anti-fog properties of this coating are particularly inert to long term immersion in water.

Example XIV

A polyvinyl pyrrolidone-vinyl acetate copolymer is substituted for the polyvinylpyrrolidone in Example X with essentially equivalent results.

Example XV

A dimethylacrylamide polymer is substituted for the polyvinylpyrrolidone in Example X with essentially equivalent results.

All of the above Examples were actually carried out except for Examples V, XIII and XIV.

I claim:

1. An anti-fog liquid coating composition comprising:
   a polymer which is polyvinylpyrrolidone, a polyvinylpyrrolidone copolymer with a polymerizable alpha olefin free of functional groups reactive with isocyanates or polydimethylacrylamide,
   a polyisocyanate prepolymer,
   a surfactant which will bond to a reaction product of the polymer and prepolymer, and
   an organic solvent to form a solution of the foregoing ingredients.

2. A coating composition in accordance with claim 1 in which the surfactant is ionic and complexes with a reaction product of the polymer and prepolymer.

3. A coating composition in accordance with claim 1 in which the surfactant is nonionic and reacts with a reaction product of the polymer and prepolymer.

4. A coating composition in accordance with claim 1 in which the surfactant is a combination of an ionic surfactant which complexes with a reaction product of the polymer and prepolymer and a nonionic surfactant which reacts with said reaction product.

5. A coating composition in accordance with any of claims 1, 2, 3 or 4 in which the ratio of the weight of the polymer to the weight of the isocyanate in the prepolymer is in the range of from about 10 to 1 to about 3 to 1.

6. A coating composition in accordance with any of claims 1, 2, 3 or 4 in which the ratio of the weight of the polymer to the weight of the isocyanate in the prepolymer is in the range of from about 10 to 1 to about 3 to 1 and the surfactant is present in an amount by weight of from about 0.1% to about 40% of the combined weights of the polymer and copolymer.

7. A coating composition in accordance with any of claims 1, 2, 3 or 4 in which the ratio of the weight of the polymer to the weight of the isocyanate in the prepolymer is in the range of from about 10 to 1 to about 3 to 1 and the surfactant is present in an amount by weight of from about 5% to about 25% of the combined weights of the polymer and copolymer.

8. A substrate,
   an anti-fog transparent coating on the substrate comprising the reaction product of a polymer of the group consisting of polyvinylpyrrolidone, a polyvinylpyrrolidone copolymer with a polymerizable alpha olefin free of functional groups reactive with isocyanates, or polydimethylacrylamide with a polyisocyanate prepolymer chemically bonded to a surfactant.

9. The combination of claim 8 in which the surfactant is ionic and is complexed with the reaction product.

10. The combination of claim 8 in which the surfactant is nonionic and is reacted with the reaction product.

11. The combination of claim 8 in which the surfacant is a combination of an ionic surfactant complexed with the reaction product and a nonionic surfactant reacted with the reaction product.

12. The combination of any of claims 8, 9, 10 or 11 in which the ratio of the weight of the polymer to the weight of the isocyanate in the prepolymer is in the range of from about 10 to 1 to about 3 to 1.

13. The combination of any of claims 8, 9, 10 or 11 in which the ratio of the weight of the polymer to the weight of the isocyanate in the prepolymer is in the range of from about 10 to 1 to about 3 to 1 and the surfactant is present in an amount by weight of from about 0.1% to about 40% of the combined weights of the polymer and copolymer.

14. The combination of any of claims 8, 9, 10 or 11 in which the ratio of the weight of the polymer to the weight of the isocyanate in the prepolymer is in the range of from about 10 to 1 to about 3 to 1 and the surfactant is present in an amount by weight of from about 5% to about 25% of the combined weights of the polymer and copolymer.

* * * * *